United States Patent
Fehl et al.

(10) Patent No.: US 6,443,328 B1
(45) Date of Patent: Sep. 3, 2002

(54) ELECTRONIC LUBE GUN WITH LOW BATTERY PROTECTION

(75) Inventors: Robert J. Fehl; Richard R. Boyle, both of Milwaukee; Joseph S. Simon, Jackson; Ronald D. Benson, Colgate, all of WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 09/595,829

(22) Filed: Jun. 16, 2000

(51) Int. Cl.[7] ................................................. B67D 5/00
(52) U.S. Cl. ............................... 222/14; 222/55; 222/1; 73/861.77; 700/283
(58) Field of Search ................................. 222/1, 14–16, 222/40, 52, 55; 73/861.77; 700/283; 705/413

(56) References Cited

U.S. PATENT DOCUMENTS

| 1,607,899 A | * | 11/1926 | Long ............................ 222/14 |
| 4,140,013 A | | 2/1979 | Hunger ..................... 73/861.77 |
| 4,406,313 A | * | 9/1983 | Bennett et al. ................. 141/1 |
| 4,807,664 A | * | 2/1989 | Wilson et al. .......... 137/624.11 |
| 4,883,199 A | | 11/1989 | Ouarve et al. |
| 5,184,309 A | | 2/1993 | Simpson et al. ............ 700/28.3 |
| 5,225,995 A | | 7/1993 | Fujiwara et al. ............. 705/413 |
| 5,433,342 A | * | 7/1995 | Luro ............................... 222/1 |
| 5,458,170 A | | 10/1995 | Ferguson ..................... 141/392 |
| 5,685,396 A | * | 11/1997 | Elkin et al. ................... 184/1.5 |
| 5,921,262 A | | 7/1999 | Campbell ........................ 137/1 |

FOREIGN PATENT DOCUMENTS

EP 787 678 A1 6/1997

* cited by examiner

*Primary Examiner*—J. Casimer Jacyna
(74) *Attorney, Agent, or Firm*—Quarles & Brady LLP

(57) ABSTRACT

A device for delivering a preset volume of fluid, such as oil, includes a casing (10) with an inlet port (16), an outlet port (17) and supply passages (22, 24) for flow of fluid from the inlet port (16) to the outlet port (17). A valve including a valve member (24) is situated to control the flow of the fluid through a valve chamber (23). The valve is manually actuated to an open position and held by momentary energization of a latching solenoid (36). When the fluid volume reaches a preset volume, the latching solenoid (36) is energized again to allow the release the valve member (24) to return to a closed position. In the event of a battery low condition, the latching solenoid (36) can be disabled, so that the valve can only be held open manually, thereby preventing an electrical failure with the valve open. A manual push button (21) is directly connected to the valve member (24) for closing the valve manually. A method for controlling the dispensing of a fluid is also disclosed.

21 Claims, 4 Drawing Sheets

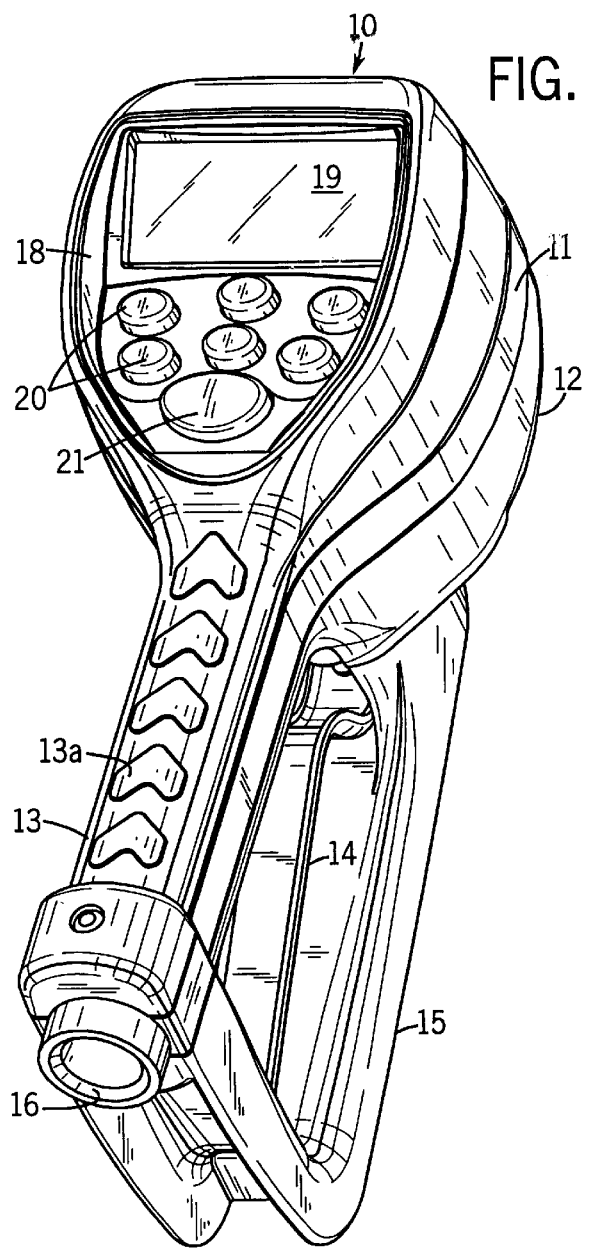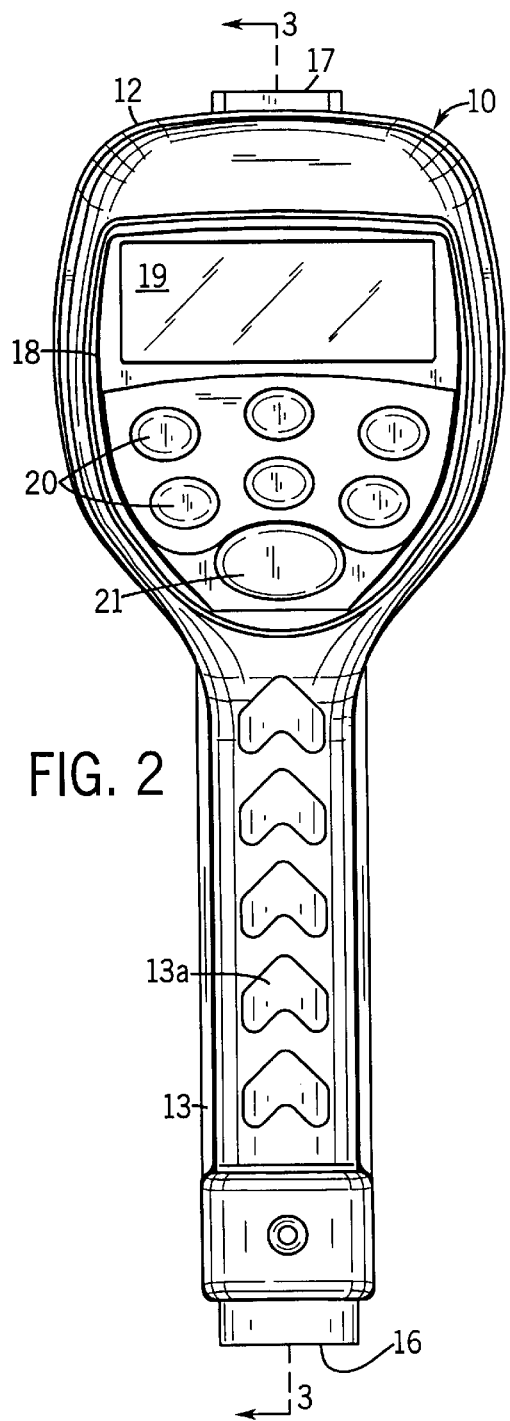

ELECTRONIC LUBE GUN WITH LOW BATTERY PROTECTION

TECHNICAL FIELD

The invention relates to metering guns or nozzles for dispensing a lubricating fluid.

BACKGROUND ART

In the field of vehicle service, handheld metering guns or nozzles are used to dispense predetermined amounts of a lubricating fluid, such as oil. The device has a lever that is squeezed against a handle to begin operation. The metering portion of the device then measures the amount of fluid passing through the device and closes a valve when a preset amount of the fluid has been dispensed. Such devices are useful in servicing vehicles using bulk supplies of oil or other lubricants. The device also has other industrial applications.

In the prior art, such devices have used mechanical metering mechanisms. These mechanisms have many parts that are subject to wear.

Electronic control offers a lower cost of manufacture, but to obtain these benefits, certain problems in converting to an electronic device must be overcome.

For convenience of use and mobility, such electronic devices must have their own power supply, typically provided by batteries. With batteries there are problems of battery life and assuring that the batteries do not fail with the valve in an open position.

An object of the present invention is to provide an electronically controlled metering device, which is less expensive to manufacture and easier to maintain than its mechanical predecessor. In addition, the device is to be protected from commencing a battery cycle when the battery is too low.

SUMMARY OF THE INVENTION

The invention is incorporated in a method and device for dispensing a lubricating fluid, in which the device is protected against low battery conditions, by disabling an electronically actuated latching device and relying on manual operation. An electronic control circuit monitors battery level and performs the disabling function when necessary as well as providing visual indications to the user. A manual override push button is also provided.

The device is conveniently programmable for multiple batch sizes and is operable in an automatic shut off mode.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF DESCRIPTION OF THE DRAWINGS

FIG. 1 is a perspective view of a device that incorporate he present invention;

FIG. 2 is a top plan view of the device of FIG. 1;

Figure 4:
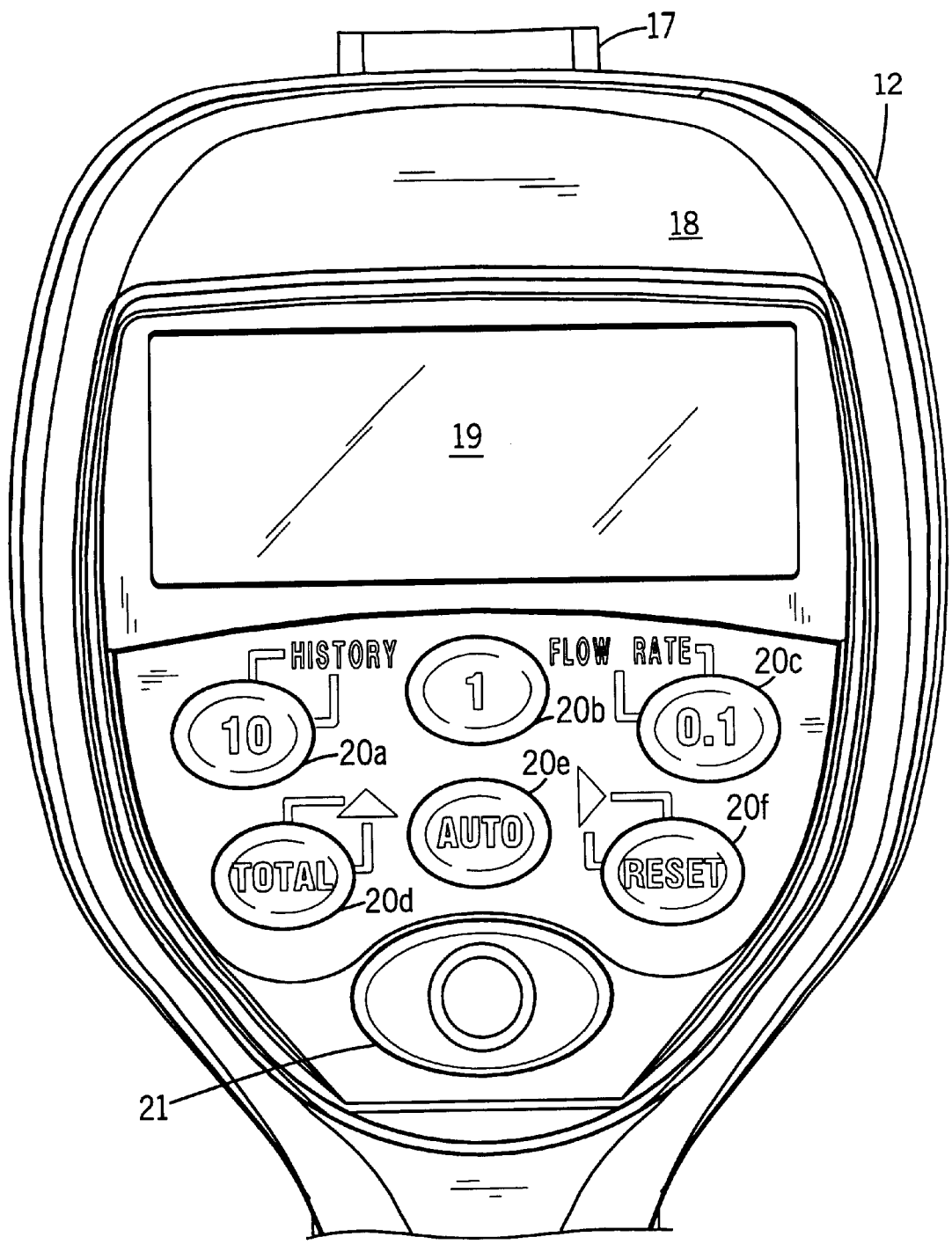
Figure 5:
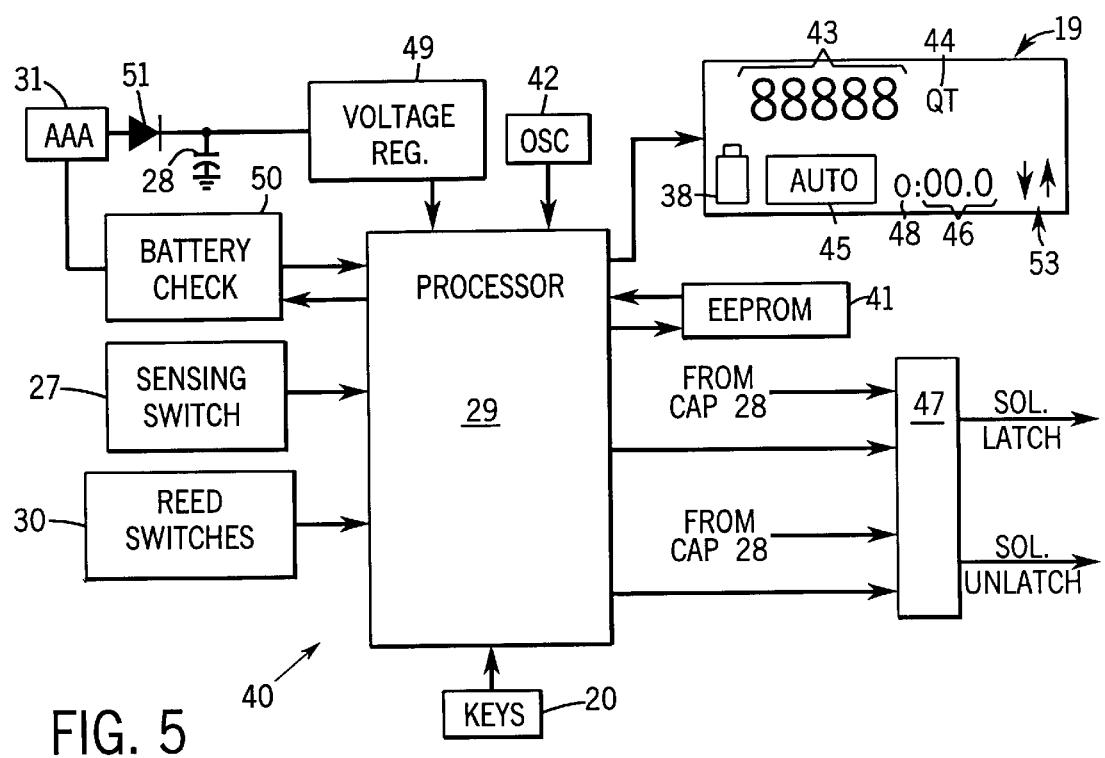

FIG. is a sectional view taken in the plane indicated by line 3—3 in FIG. 2;

FIG. 4 is an enlarged detail view of a display portion of the device of FIGS. 1 and 2; and FIG. 5 is an electrical schematic of the electrical system in the device of FIGS. 1 and 2.

DETAILED DESCRIPTION OF THE PREFERRED EMBODIMENTS

Figure 3:
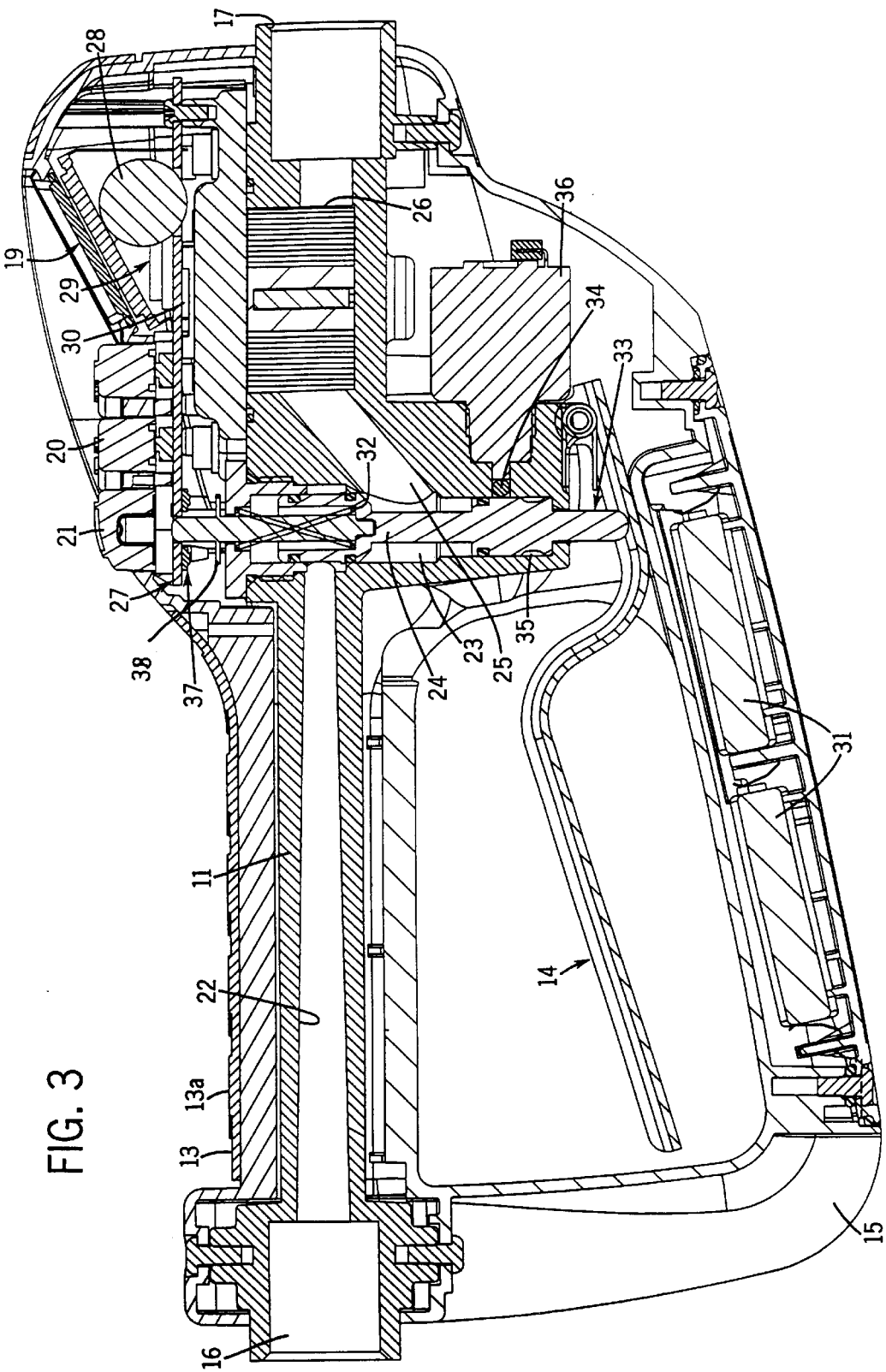

Referring to FIG. 1, the device of the present invention includes a casing 10, primarily of molded plastic material, except for an exposed metal band, which is an outside edge of a metal band housing 11 seen in section in FIG. 3. The casing 10 (FIG. 1) includes a head portion 12, a rounded handle 13 extending from the head portion 12, and a trigger guard portion 15 which extends from the head portion 12 and connects to a distal end of the handle 13. The device includes a trigger 14, provided as a metal lever, which when squeezed against the handle 13 to further operate a valve (not shown in FIG. 1) which opens and closes to control the flow of liquid. The liquid enters through inlet port 16 and exits through outlet port 17. Chevron-shaped treads or projections 13a are spaced along the handle 13 to provide for a better grip.

The device also includes a bezel portion 18 which fits around a visual display 19 and a group of six programming keys 20 and one mechanical push button 21 to be described in greater detail below.

Referring to FIG. 3, lubricating liquid flows into inlet port 16 and through supply passage 22 to a valve chamber 23. A valve member 24, more specifically referred to as a valve spool, is arranged vertically in a valve seat for movement up and down to control liquid flow through the valve chamber 23. On the other side of valve chamber 23, a second, inclined, supply passage 25 connects to a metering chamber in which two eccentric metering gears 26 turn in response to liquid flow. The liquid flows through metering gears 26 and out of the outlet port 17.

It can now be seen that button 21 is directly and mechanically connected to valve member 24, and this is an emergency button 21 for closing the valve (as seen in FIG. 3) and shutting off liquid flow.

An electronic circuit board 27 is installed under the display 19 and programming keys 20 of the head portion 12 of the casing 10 (FIGS. 1 and 3). A large capacitor 28 is mounted on the circuit board 27 along with a microelectronic processor 29, to reed switches 30, to a display 19 and to other components to be described below. Power for the processor 29 is provided by four AAA-sized batteries 31 located within the trigger guard portion 15 of the casing 10.

The processor 29 executes a control program stored in memory to count metering pulses generated by gears 26 and sensed through the reed switches 30 to units of flow and displays the value on display 19. The display 19 is capable of showing flow parameters, including for example, total volume and rate of flow.

The metering gears 26 include permanent magnets (not shown). As the gears 26 and magnets rotate, they cause reed switches 30 to open and close due to the change in polarity of the magnetic field generated by the permanent magnets. The electrical pulses generated by the reed switches 30 are communicated to the processor 29 located on circuit board 27.

The metering device 10 has a manual mode of operation and an automatic mode of operation.

In the manual mode, squeezing the trigger 14 towards the handle 13 causes the trigger 14 to contact and move a tip 33 of the valve member 24, causing spool 24 to be lifted upward to a position in which valve chamber 23 communicates with supply passage 22. Valve chamber 23 is also in communication with supply passage 25, to complete a flow path for the liquid from inlet 16 to gears 26 and eventually to outlet 17. The metering gears 26 rotate at a rate proportional to the flow rate of the liquid.

Once the user is satisfied with the volume of liquid dispensed and shown on display 19 (FIG. 5), the user releases the trigger 14, which allows valve member 24 to return its initial or blocking position, assisted by a return spring 32 positioned along a portion of valve member 24, and this causes the flow of liquid to stop. The final delivered volume is then read on display 19.

Operation in the automatic preset dispense mode is similar to manual operation, except that the meter is programmed with the desired preset batch values prior to squeezing the trigger 14. Once programmed, the processor 29 monitors the throughput of the meter and automatically closes valve 23, 24 to stop the delivery of the liquid at the programmed value.

Programming is accomplished by programming keys 20 in conjunction with display 19. The meter can be programmed in various units up to a value of "999". The display 19 can either count up to the programmed value or down from the programmed value to zero. Preset values for up to a total of six can be stored in the memory of processor 29 and recalled for repeat batches.

Once the batch programming is complete, the trigger 14 (FIG. 3) is pressed to initiate flow through the device 10. In the automatic mode, however, the valve 23, 24 is latched in the open position by a ball 34 engaging in a groove 35 machined into valve member 24. The ball 34 in turn is held in the groove 35 in the valve member 24 by the actuation of latching solenoid 36 to a latching position. The solenoid receives the energy required for this operation from capacitator 28. The signal to operate the latching solenoid 36 is provided by processor 29, which receives information about the valve member 24 position from sensing switch 37 (FIG. 3) mounted on the underside of circuit board 27. The valve member 24 carries a flange 38, and when the valve member 24 is moved upward, flange 38 contacts switch 37 to actuate it. The actuation of the switch 37 causes the discharge of the capacitor 28. The movement of the valve member 24 causes the engagement of ball 34 in the groove 35 in valve member 24. The processor 29 times the capacitor discharge for an interval, such as, for example, 25 milliseconds. When trigger 14 is squeezed toward handle 13, switch 37 sends a signal to processor 29 which in turn controls the time of discharge of the capacitor 28. This minimizes the energy required to latch valve member 24 in the open position, thus extending the life of batteries 31.

At any time during the delivery of liquid in the automatic mode, the flow of liquid through the device 10 can be interrupted by pressing manual override push button 21. Push button 21 is directly connected to valve member 24 (FIG. 3) and, when pushed, will force the ball 34 out of the groove 35 and unlatch magnetic latching solenoid 36. Once unlatched, valve member 24 will be allowed to drop to the closed position to stop the flow of the liquid. The flow of liquid through the device can be resumed by once again by squeezing trigger 14 and restarting the automatic dispensing function. Flow will continue until the original programmed value is reached.

When a programmed batch value has been delivered, and absent operation of the manual push button 21, the processor 29 sends a signal that allows the capacitor 28 to discharge, sending a reverse polarity pulse as the solenoid unlatching signal. This momentary pulse overcomes the latching function of solenoid 36 (FIG. 3), which releases ball 34 and allows valve member 24 to return to its position stopping the flow of liquid.

The processor 29 senses the available voltage of batteries 31 and determines if there is enough energy available to successfully operate the device. This battery sensing function operates at two levels.

If the battery voltage falls below a first specified value, the processor 29 turns on a low battery icon 38 (FIG. 5) on display 19 to inform the user that the batteries need to be changed. This first indication is informational only, and the device is allowed to continue to operate in all modes.

If battery voltage falls to a second, lower battery threshold value, the low battery indicator 38 on display 19 remains lit, but the device is not allowed to be operated in the automatic mode. Auto icon 45, the digits 46, 48 and the count direction arrows 53 will all disappear from screen of the display 19. This prevents a user from starting a preset batching operation that cannot be automatically terminated due to a lack of energy in the batteries 31. At this point, however, the device can still be used in the manual mode until such time as batteries 31 cannot operate processor 29 or display 19.

When the batteries are completely exhausted, the device can still be operated as a non-metering valve using the trigger 14 to control the flow of oil as long as the trigger 14 is squeezed against the handle 12.

Referring to FIG. 5, an electronic control circuit 40 mounted on circuit board 27 includes processor 29, which in the preferred embodiment, is provided by an MSP 430 microelectronic processor 29 with on-board memory available from Texas Instruments, Inc. A control program of instructions is stored in the on-board memory to carry out the control functions described herein. A EEPROM 41 is also connected to the processor 29 to store user settings and batch histories. A crystal oscillator circuit 42 provides timing signals for driving the processor 29. The processor 29 reads inputs from programming keys 20. It transmits data to display 19, which has five major digits 43, three unit-of-measure digits 44, a low battery indicator 38, an automatic mode indicator 45, a digit 48 for indicating batch mode and three digits 46 for indicating batch amount. The processor 29 also transmits control signals to enable latching the solenoid 36 (SOL. LATCH) and to enable unlatching the solenoid 36 (SOL. UNLATCH). These are coupled to the solenoid 36 through power transistor circuits 47. The processor 29 also senses input signals from reed switches 30 and trigger sensing switch 27. The processor 29 senses the voltage of the batteries 31 through a battery check circuit 50. The batteries supply six dc volts unregulated power to a voltage regulator circuit 49, which supplies 3.5 dc volts power to the other circuitry in the control circuit 40. The capacitor 38 is connected through a diode 51 to the batteries 31 to be charged by the batteries 31 to six dc volts unregulated power.

To program the device in the automatic mode, the "AUTO" key 20e (FIG. 4) is pressed until elements 43, 44, 45, 46 and 53 appear on the screen display 19 as seen in FIG. 5. The device is now in batch programming mode. The first digit 48 next to the auto mode indicator 45 will be flashing. There are seven values, 0–6. Pressing the "TOTAL/UP" key 20d (FIG. 4) will scroll the value from 0 to 6. Value "0" is the off setting for the automatic mode. Leaving the device in this mode will disable the batch function. If the mode digit is incremented to "1", the digits 46 can be set to a batch value using the the "10/HISTORY" key 20a, the "1" key 20b, and "0.1/FLOW RATE" key 20c to select the batch size. If the "RESET/RIGHT" key 20f is now pressed, the count up/count down arrow 53 will flash. The count can now be adjusted using the "TOTAL/UP" key 20d. During normal operations, if the device is in the count down mode, then pressing the "RESET/RIGHT" key 20f will clear the previous total and replace it with the value of the batch selection. Pressing the "RESET/RIGHT" key 20f in the count-up mode causes the main digits to be replaced with zeros. When all of the batch selections have been made, the "AUTO" key 20e is pressed again and held until the screen fills up entirely. The device will then automatically reset. Whichever batch mode number was flashing will now be the choice displayed on the screen, but the choice number digit itself will not be visible. This helps the user determine if they are in auto program mode or not.

Pressing the "TOTAL/UP" key 20d key, when not in a programming mode, will display the total volume of liquid that has passed through the device for three seconds, and then it will display the reset total for three seconds. It will keep alternating between these two totals. To clear the reset total, the "RESET/RIGHT" key 20f is pressed when the reset total is visible. The total is cleared by selecting the initial programming mode and changing the units from liters to pints, gallons, or quarts, or vice versa. A scale factor value can be viewed by pressing and holding both the "TOTAL/UP" key 20d key and the "AUTO" key 20e.

The device displays the previous five batches. By simply pressing the "10/HISTORY" key 20a, and the screen will display the most recent batch volume. The display 19 will increment through all five previous batches as long as the key 20a is held.

To use the meter for batching, the desired value is entered and the count direction is determined as described above, and then the trigger is operated. When the desired volume is dispensed, the meter will stop the flow by closing the valve 23, 24. If the user desires to top off at this point, the trigger 14 is operated once more and held until the desired result is met. The "RESET/RIGHT" key 20f is pressed when finished, and the meter is ready for the next batch. The "RESET/RIGHT" key 20f is pressed to clear an old batch and to start a new batch. A batch can be aborted by pressing the red manual push button 21.

The device is capable of sensing and displaying the flow rate. With liquid flowing through the device, and the "0.1/FLOW RATE" key 20c is pressed, the rate will be displayed at the batch selection digits 46 until the key is released 20c. The flow rate screen will not appear if the key 20c is pressed with no flow present.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

We claim:

1. A method of dispensing an amount of lubricating liquid, the method comprising:
   manually actuating a valve to move from a closed position to an open position;
   momentarily energizing an electrically operable device for a first time to latch the valve in the open position;
   measuring a parameter of the flow of the liquid; and
   in response to the parameter equaling a preset amount, momentarily energizing the electrically operable device for a second time to unlatch the valve and allow the valve to return to a closed position and stop the flow of liquid,
   whereby limiting the momentary energizing of the electrically operable device to latch and unlatch the valve conserves the life of at least one electrical battery.

2. The method of claim 1, further comprising:
   monitoring the condition of a battery supplying power to the device; and
   in response to sensing a battery low condition, disabling the electrically operated latching device.

3. The method of claim 1, further comprising manually overriding the latching device in response to operation by the user.

4. The method of claim 1, wherein the first time is a time period limited to approximately 25 milliseconds.

5. The method of claim 4, wherein the second time is a time period limited to approximately 25 milliseconds.

6. A method of dispensing an amount of lubricating liquid, the method comprising:
   manually actuating a valve from a closed position to an open position;
   momentarily energizing an electrically operated latching device to hold open the valve for starting a flow of the liquid;
   measuring a parameter of the flow of the liquid; and
   in response to the parameter equaling a preset amount, momentarily energizing the latching device again to allow the valve to return to a closed position and stop the flow of liquid,
   wherein the momentary energizing results from discharging a charged capacitor; and
   whereby the momentary energizing of the latching device conserves the life of at least one electrical battery.

7. The method of claim 6, the discharging of the charged capacitor is controlled for a timed interval.

8. The method of claim 7, further comprising sensing the operation of the valve from a closed position to an open position, and initiating the discharging of the capacitor in response to the operation of the valve.

9. A device for delivering a preset volume of liquid lubricant, the device being characterized by:
   a valve including a valve member situated to control liquid flow through a supply passage to an outlet;
   an electrically operable latching mechanism for holding the valve member in an open position in which the supply passage is open to the flow of liquid;
   a manually operable member for moving the valve member from a closed position to the open position;
   a metering device operable to measure a parameter of flow of the liquid; and
   a control circuit for sensing the movement of the manually operable member and responsive thereto for energizing the electrically operable latching mechanism for a first time for holding the valve member in the open position for a dispensing cycle; and
   further characterized in that the control circuit is operably connected to the metering device to measure units of the flow parameter, and in response to the flow parameter equaling a preset amount, the control circuit causes energization of the latching mechanism for a second time to allow the valve member to return to a closed position and end the dispensing cycle.

10. The device of claim 9, wherein the device includes a visual indicator, wherein the control circuit is adapted to receive power from a battery inserted in the device, and wherein the control circuit monitors a level of voltage available from the battery level, and in response to a battery low condition actuates the visual indicator to show the battery low condition.

11. The device of claim 9, wherein the control circuit is adapted to receive power from a battery inserted in the device, and wherein the control circuit monitors a level of voltage available from the battery level, and in response to a battery low condition disables energizing of the latching mechanism.

12. The device of claim 9, wherein a manually operable stop button is operably coupled to said valve member for manually unlatching the latching mechanism to close the valve and stop flow of the liquid.

13. The device of claim 9, further characterized by a visual display, a set of programming keys adjacent the visual display, and further characterized in that the manually operably member is positioned adjacent the programming keys.

14. The device of claim 9, wherein the device includes a handle and a housing extending from the handle and containing the valve, the latching mechanism, the metering device and the control circuit and a removable battery, when inserted, and wherein the manually operable member is a lever for squeezing against the handle.

15. The device of claim 9, further comprising an electrical switch disposed for contact and actuation by movement of the valve member from an open position to a closed position; and wherein the control circuit is responsive to the actuation of the switch for energizing the electrically operable latching mechanism.

16. The device of claim 9, wherein the first time is a time period limited to approximately 25 milliseconds.

17. The device of claim 16, wherein the second time is a time period limited to approximately 25 milliseconds.

18. A device for delivering a preset volume of liquid lubricant, the device comprising:

a valve including a valve member situated to control liquid flow through a supply passage to an outlet;

an electrically operable latching mechanism for holding the valve member in an open position in which the supply passage is open to the flow of liquid;

a manually operable member for moving the valve member from a closed position to the open position;

a metering device operable to measure a parameter of flow of the liquid; and a control circuit for sensing the movement of the manually operable member and responsive thereto for energizing the electrically operable latching mechanism for holding the valve member in the open position; and wherein the control circuit is operably connected to the metering device to measure units of the flow parameter, and in response to the flow parameter equaling a preset amount, the control circuit causes energization of the latching mechanism to allow the valve member to return to a closed position; and further comprising a capacitor that is discharged in response to a control signal from the processor for energizing the latching mechanism.

19. The device of claim 18, wherein the processor controls the discharging of the charged capacitor over a timed interval.

20. The device of claim 19, further comprising a sensor for sensing the operation of the valve by sensing the position of a valve member and for signaling the control circuit.

21. A method of dispensing an amount of lubricating liquid, the method comprising:

manually actuating a valve to move from a closed position to an open position;

momentarily energizing an electrically actuated, mechanically latched mechanism to latch the valve in the open position;

overriding the latching device to close the valve and interrupt the flow of liquid;

manually actuating the valve a second time to open the valve again;

momentarily energizing the electrically actuated, mechanically latched mechanism a second time to latch the valve in the open position; and in response to a flow parameter equaling a batch preset amount, momentarily energizing the latching mechanism again for releasing the mechanically latched mechanism to allow the valve to return to a closed position and stop the flow of liquid.

* * * * *